Oct. 31, 1944.  T. P. SIMPSON ET AL  2,361,571
CATALYST REGENERATION
Filed July 10, 1942    2 Sheets-Sheet 1
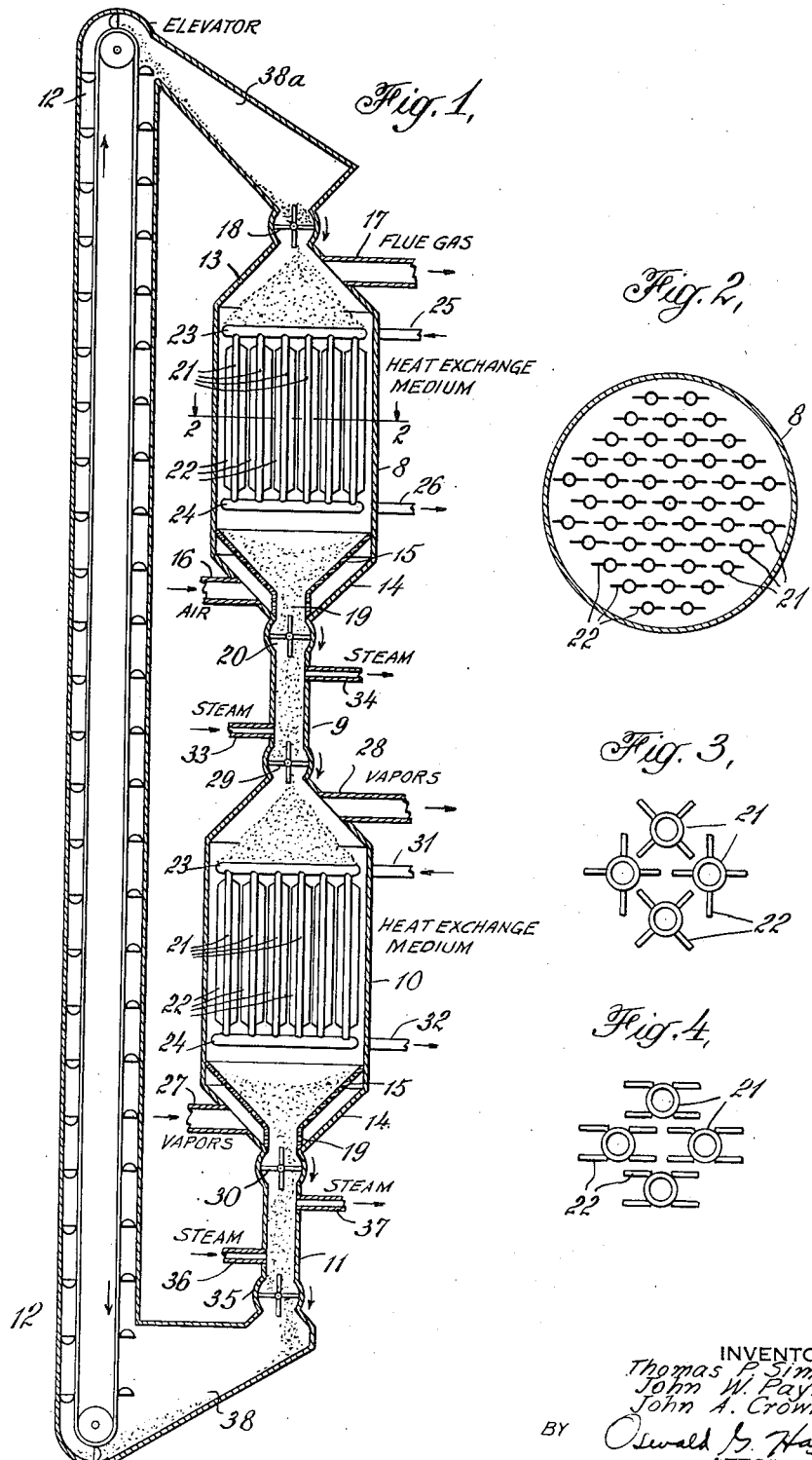
INVENTORS
Thomas P. Simpson
John W. Payne and
John A. Crowley, Jr.
BY Oswald G. Hayes
ATTORNEY

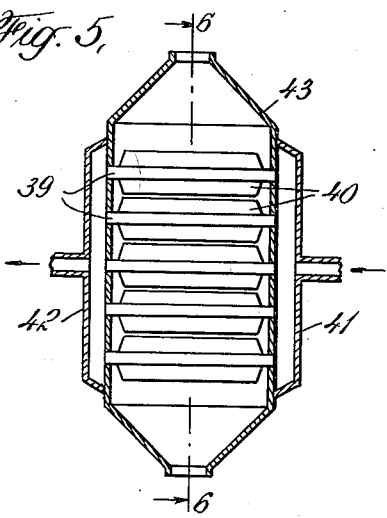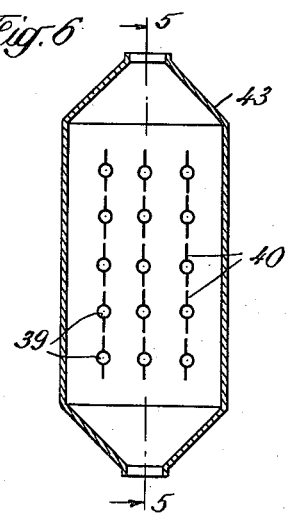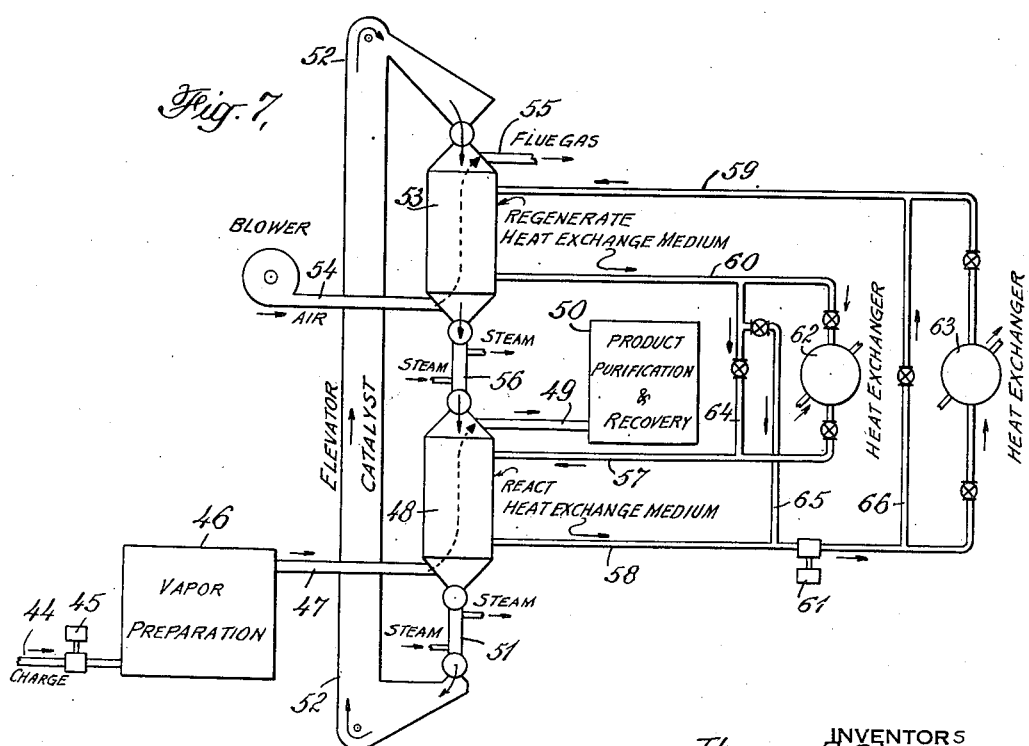

Patented Oct. 31, 1944

2,361,571

UNITED STATES PATENT OFFICE 2,361,571

CATALYST REGENERATION

Thomas P. Simpson, John W. Payne, and John A. Crowley, Jr., Woodbury, N. J., assignors to Socony-Vacuum Oil Company, Incorporated, a corporation of New York Application July 10, 1942, Serial No. 450,414

15 Claims. (Cl. 196—52)

This invention is directed to methods of conducting reactions in the presence of a contact mass, such as, for example, the catalytic conversion of hydrocarbons.

It is known that many operations for the conversion of hydrocarbon materials to other hydrocarbon material of differing physical and/or chemical properties may be carried out catalytically. Most of these are carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, desulphurizing, partial oxidation and similar conversions of hydrocarbon materials. The method of operation and apparatus herein disclosed are applicable to all such conversions. Of these operations, the vapor phase cracking of heavy hydrocarbons to gasoline is typical, and this specification will hereinafter discuss such operation as exemplary, without, however, intending to be limited thereby or thereto except by such limits as may appear in the claims.

Such catalytic processes generally make use of reaction chambers containing a fixed body of catalyst or contact mass, through which the reaction mixture is passed, and in which, after the reaction has slowed down to an uneconomic point, the contact mass is regenerated in situ. Such processes are not continuous, and only attain continuity by the provision of numerous reaction chambers which are alternately placed on stream and on regeneration. Likewise, it is difficult to maintain constant quantity and quality of product without numerous chambers and intricate scheduling, due to the progressively decreasing activity of catalyst. This same feature, with apparatus limitations, prevents, to a degree, the use of catalyst, at a uniform high efficiency level. Most of these difficulties may be avoided by the use of a method wherein the catalyst or contact mass is handled continuously as well. This invention is specifically directed to such a process.

This invention has for its object the provision of a process of hydrocarbon oil conversion wherein a continuously moving stream of hydrocarbon oil is contacted with a continuously moving stream of catalyst for the accomplishment of conversion, in which the catalytic material is used only at a high level of efficiency, and in which the catalytic material is continuously regenerated and returned to the conversion step, both operations being conducted under controlled conditions. An equally important object is the provision of proper apparatus in which such a process may be carried out.

This invention is based upon the principle of carrying out catalytic reactions by flowing a stream of reaction mixture in physical contact with a flowing stream of catalytic material, through a reaction zone in which it is controlled as to temperature by the action of a heat exchange medium.

In order that this invention may be understood, reference is made to the drawings attached to and made a part of this specification. In these drawings, Figure 1 shows in diagram form a reaction and regeneration apparatus suitable for use in this process, Figures 2, 3, 4, 5 and 6 are concerned with internal details of such chambers, and Figure 7 shows in diagram form a set-up of apparatus suitable for the conversion of hydrocarbon oils.

In Figure 1, character 8 denotes a regeneration chamber, 9 a purging section, 10 a reaction chamber, 11 a second purging section, and 12 an elevator for catalyst particles. Regeneration chamber 8 and reaction chamber 10 are similar in construction and internal fittings and consist (referring now to 8) of an exterior shell 8, which may be cylindrical or rectangular in cross-section, with a convergent sealed top 13 and a convergent bottom 14, and fitted with an interior false bottom 15, which is perforate, the perforations therein being too small for the passage of catalyst particles but permitting the passage of liquid or gas. Bottom 14 is fitted with pipe 16, and top 13 with pipe 17. At the top of 13 is a sealed feeding device 18, which may be a star wheel as shown, an intermittently operated valve set-up or other common device of this nature. Catalyst material introduced through 18 fills the interior of shell 8, passes down therethrough, is collected by false bottom 15 and shute 19 and is removed by a second intermittently operating device, such as star wheel 20. This arrangement effects a continuously moving stream of catalytic material through shell 8. Reaction mixture, in this case air for an oxidizing regeneration, may be introduced through pipe 16 and products of reaction, in this case flue gas, may be removed through pipe 17.

This effects a continuously flowing stream of reaction material in physical contact with the continuously flowing stream of catalytic material in shell 8. The flow shown is countercurrent. If desired, it may be made concurrent by reversing the functions of 16 and 17. Shell 8 is also internally fitted with a series of conduits 21, equipped with fins 22, joined to headers 23 and 24, through which a heat exchange medium may be passed by means of pipes 25 and 26. The heat exchange medium may be used to control the temperature of reaction by extraction of heat from or addition of heat to the material within shell 8, and its flow may be concurrent, countercurrent, or, as later shown, transverse to the direction of flow of catalytic material. Shell 10 is similarly fitted and similarly operated. Reaction material, in this case hydrocarbons, is introduced by 27, and removed by 28, catalyst movement is controlled by 29 and 30, and heat exchange medium is circulated by pipes 31 and 32. Confined passage 9, maintained relatively full of catalyst by devices 20 and 29, is fitted with pipes 33 and 34, by means of which steam may be passed through the catalyst for purging. A similar purging passage 11 lies below shell 10, is controlled by devices 30 and 35, and fitted with steam pipes 36 and 37 for purging catalyst after reaction. From 11 the catalyst drops through 35 into boot 38 of elevator 12 by which it is elevated and discharged into bin 38a above shell 8. Elevator 12 may be of the belt and bucket type shown or of any other kind suitable for the physical properties of the catalytic materials. It will be seen that in apparatus of the type shown in Figure 1 there is a controlled gravity flow of catalyst through shells 8 and 10 into the feed boot 38 of the elevator 12 which returns spent catalyst to the inlet of shell 10, thereby providing means for carrying out the continuous catalytic process contemplated herein with a high degree of thermal efficiency because the hot catalyst does not have an opportunity to cool to atmospheric temperature during its movement through the circuit. Obviously, arrangements other than that described above may be employed to effect the movement of catalyst successively through a conversion chamber and a regenerating chamber without permitting it to cool to atmospheric temperature. Customary devices for the removal of fines and the addition of makeup may be inserted in the catalyst conveyor system. Special attention should be given to the arrangement of heat exchange tubes within the shells 8 and 10. These should be so arranged as to promote the passage of catalytic material and reaction material longitudinally through the shell in such manner that the flowing material is at all times in heat exchange relationship with the heat exchange medium while in the zone of heat exchange elements. It will be seen from the drawings that a zone above and a zone below the heat exchange tubes provide space in which the temperature is independent of control other than temperature of reactants and nature of the reactions taking place. The conduits may be unfinned, but better results are obtained if the external heat transfer surface of the heat exchange tubes is augmented by the addition of fins thereto. These fins, primarily added for heat transfer reasons may be taken advantage of to assist in control of the flow of catalyst and reaction fluid and contact therebetween by being disposed so that they, together with the tubes, divide the space within the shell into a series of longitudinal passages of substantially constant cross-section throughout their length. These passages should be of such dimensions that all portions of the reaction material therein are in efficient heat exchange relationship with the heat exchange medium in the tubes. The proper dimensions for this condition depend somewhat upon the physical nature of the catalyst. A commonly used catalyst for such purposes is a rod-shaped clay particle, about 2½ mm. diameter by 4 mm. average length, and with such particles the passages should be so arranged that no catalyst particle will be further removed from a heat extractive surface than about 1 inch, and the total volume in cubic inches of the passages containing catalyst and reaction mixture should be numerically about one-eighth to twice the surface in square inches of the heat transfer surface in contact with the passages. Catalyst particles of different heat conductivity, or of different packing characteristics, or variations in the contemplated intensity of reaction per unit volume of catalyst, as well as considerations of heat transfer and pressure drop will vary the ratio somewhat. The length of the reaction and regeneration passages should be relatively great, say from 3 to 15 feet.

Figure 2 shows a cross-section of case 8 at the level 2—2 showing how the preferred longitudinal passages may be formed by equipping each heat exchange tube with two diametrically opposed, longitudinally disposed axial fins. Figures 3 and 4 show other ways of arriving at the same result. The heat transfer tubes need not be arranged parallel to the flow of catalyst, but may well be transverse thereto, as shown in Figures 5 and 6, wherein transverse tubes 39, carrying fins 40, extend between header boxes 41 and 42 in a shell 43, to exercise the same functions as corresponding parts in shells 8 and 10.

The heat exchange medium may be any fluid suitable for the load and temperature levels encountered, such as gases, liquids of various kinds, molten metals, or alloys, or fused salts. Preferably it should be possessed of a low vapor pressure, low viscosity, and high specific heat at temperatures between 600° and 1100° F., non-corrosive to steel, and fluid at about 300°–350° F. so that it may be removed from shut-down apparatus by steam heating. Convenient materials for such use are mixtures of the strong alkali salts of the oxy acids of nitrogen.

Passages 9 and 11, used for purging by passing steam through the catalyst particles, should be so proportioned that a sufficient contact of steam and catalyst particles occurs to remove the residual volatile products of the preceding reaction.

Turning to Figure 7, which shows an operating setup appropriate for a conversion of hydrocarbons, such as, for example, a vapor phase cracking, we find charge oil fed through pipe 44 by pump 45 to a vapor preparation unit 46. Vapor preparation unit 46 will consist essentially of a heater, for which purpose any of the usual forms of heater common in the art, say a pipe still, may be used, to heat and vaporize the charge and heat it to reaction temperature, and, if the charge used is not wholly vaporized at the reaction temperature, a vapor separator to remove unvaporized liquid residue. Vapors from 46 move through pipe 47 into and through reaction chamber 48 (the same as 10, Figure 1), and therein undergo catalytic reaction. Reaction products pass through pipe 49 to product purification and recovery equipment denoted by 50. 50 may be made up of any of the usual fractionation, separation and disposal devices currently in common use for handling products of cracking reactions. If desired, product fractions boiling above the desired low-boiling product may be returned to the system for retreatment, either separately or in admixture with fresh charge. Catalytic material flowing from 48 is purged in 51 and elevated by 52 to be introduced into 53 wherein it is regenerated by burning with air supplied by blower and pipe 54, the products of regeneration being disposed of through pipe 55, after which the regenerated catalyst is purged in 56 and returned to 48. The temperature level of the reaction in 48 may be controlled and latent heat of reaction added thereto by a heat exchange medium introduced through pipe 57 and removed through pipe 58. In the arrangement shown in Figure 7 the same heat exchange medium used in 48 may also be used to control the temperature of regeneration in 53. In the operation described herein, where the regeneration is an exothermic reaction, the function of the heat exchange medium in the intermediate region of chamber 53 is to prevent the temperature of regeneration reaching a point which would cause heat damage to the catalyst and at the same time permitting combustion of the carbonaceous deposit thereon. Thus the heat exchange medium in 53 acts to adjust and maintain the temperature of the moving mass in the intermediate region thereof, between a minimum temperature below which burning of the carbonaceous deposit in the presence of oxidizing gases at an appreciable rate cannot occur and a maximum temperature above which the catalytic material would be damaged by heat. For example, the temperature for regeneration of a spent clay catalyst used in cracking hydrocarbons may range from around the cracking temperature (from about 800° to about 950° F.) to a peak temperature in the neighborhood of 1050° to 1100° F. Care should be exercised so that the regenerating temperature does not rise substantially above 1200° F. or serious damage to a catalyst of this type may result. In the arrangement shown in Figure 7, the heat exchange medium is introduced into 53 by pipe 59 and removed by pipe 60. The heat exchange medium is circulated by pump 61 and the temperature for the several uses may be controlled by use of various combinations of heat exchangers 62 and 63 and by-passes 64, 65 and 66 in a manner obvious to those skilled in the art.

As an example of one operation successfully conducted in such apparatus, according to the process herein disclosed, coastal gas oil with which was admixed steam to the extent of about $$\frac{10 \text{ oil}}{1 \text{ water}}$$

(cold volumes), at a temperature of 800° F. was contacted with a cataylst of activated clay granules at a rate of one volume of oil (cold) to four volumes of clay in a chamber through which the clay passed at such a rate that it remained in the reaction zone about 20 minutes, with the following results:

| | |
|---|---|
| Yield of 410° E. P. gasoline (including isobutane and heavier in gas) | 67.4% (vol. %) |
| Yield of dry gas (lighter than isobutane) | 4.0% (wt. %) |
| Yield of coke | 2.5% (wt. %) |
| Yield of recycle stock | 35.0% (vol. %) |

In this run the catalyst was passed through the regeneration chamber (of the same size as the reaction chamber) at the same rate, and was burned with a sufficient volume of air to maintain above 10% $CO_2$ in the exit flue gas.

The temperature of the reaction was held by use of the heat exchange medium at 800° F., and in the same manner the temperature of the regeneration was not allowed to rise above 1100° F.

The gasoline produced was of excellent quality, high in anti-knock rating, and the recycle stock was clean, light in color, and of about the same boiling range as the charge. No high boiling, dirty, liquid cracking tar was produced. The regenerated catalyst was equal in efficiency to new catalyst, no detectable deterioration in quality being found.

The regions in the chambers 8 and 10 above and below the heat exchange regions aid materially in accomplishing the desired result efficiently. In the upper regions of initial contact of catalyst with gases, there is a conditioning and initial reaction of the catalyst. Likewise, in the lower regions of final contact of out-going catalyst, there is a conditioning of the incoming gases. These contacts in the absence of heat control are particularly advantageous in the regeneration chamber. In the initial contacting region in the upper part of the regeneration zone, hot gases containing appreciable amounts of residual oxygen come in contact with spent catalyst. The catalyst is thereby heated partially by direct heat exchange with hot gases and partially by reaction between residual oxygen in the hot gases and the carbonaceous deposit on the catalyst. In the final contacting region in the lower part of the regeneration zone, hot catalyst, from which the carbonaceous deposit has been largely removed, contacts fresh pre-heated air. A burning results in the absence of positive heat control which permits of almost complete removal of carbonaceous contaminant while the air is raised in temperature.

It is to be understood that the specific examples and numerical data herein disclosed are set forth only as exemplary, and that the invention is not to be limited thereby or thereto, but is to be subject only to those limitations expressed in the following claims.

This application is a continuation-in-part of our copending application Serial No. 361,440, filed October 16, 1940, which, in turn, is a continuation-in-part of our application Serial No. 162,541, filed September 4, 1937.

We claim:

1. In the catalytic conversion of hydrocarbons by contact with a mass of adsorptive catalytic material in particle form wherein the said catalytic material is continuously passed through a reaction zone in contact with hydrocarbon vapors resulting in conversion of the vapors and deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in said zone in the absence of substantial temperature control, passing said mass at the temperature so achieved to an intermediate region, passing oxidizing gas in contact with said material in said intermediate region, abstracting heat therefrom by passing a fluid heat exchange medium in indirect heat exchange relationship with at least a portion of said mass in said intermediate region to adjust and maintain the temperature of said mass in said intermediate region between a minimum temperature below which burning of said substance will not take place in the presence of oxygen containing gases and a maximum temperature above which said material is damaged by heat, thereafter passing said mass through a third region and passing oxygen containing gases through said mass in said third region in the absence of substantial heat control.

2. In the catalytic conversion of hydrocarbons by contact with a mass of adsorptive catalytic material in particle form wherein the said catalytic material is continuously passed through a reaction zone in contact with hydrocarbon vapors resulting in conversion of the vapors and deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in the upper part of said zone while permitting the temperature thereof to rise, passing said mass at the temperature so achieved to a heat exchange region in said zone, passing a fluid heat exchange medium in indirect heat exchange relationship with said mass in said heat exchange region to adjust and maintain the temperature of said mass in said heat exchange region between a minimum temperature below which burning of said substance will not take place in the presence of oxygen containing gases and a maximum temperature above which said material is damaged by heat, thereafter passing said mass through a third region in the lower part of said zone and passing oxygen containing gases through said mass in said third region in the absence of substantial heat control.

3. In the catalytic conversion of hydrocarbons by contact with a mass of adsorptive catalytic material in particle form wherein the said catalytic material is continuously passed through a reaction zone in contact with hydrocarbon vapors resulting in conversion of the vapors and deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in the upper part of said zone while permitting the temperature thereof to rise, passing a fluid heat exchange medium in indirect heat exchange relationship with said mass in an intermediate region below said initial region to adjust and maintain the temperature of said mass in said heat exchange region between a minimum temperature below which burning of said substance will not take place in the presence of oxygen containing gases and a maximum temperature above which said material is damaged by heat, passing oxidizing gas in contact with said material in said intermediate region, thereafter passing said mass through a third region and passing oxygen containing gases through said mass in said third region in the absence of substantial heat control.

4. The method of regenerating a particle form solid adsorbent material contaminated by a carbonaceous deposit which comprises continuously passing said material as a mass of particles downwardly through a regeneration zone, passing hot oxygen containing gases through said mass in an initial contacting region in said zone in the absence of substantial temperature control, passing said mass at the temperature so achieved to an intermediate region, passing oxidizing gas in contact with said material in said intermediate region, abstracting heat therefrom by passing a fluid heat exchange medium in indirect heat exchange relationship with at least a portion of said mass in said intermediate region to adjust and maintain the temperature of said mass in said intermediate region between a minimum temperature below which burning of said substance will not take place in the presence of oxygen containing gases and a maximum temperature above which said material is damaged by heat, thereafter passing said mass through a third region and passing oxygen containing gases through said mass in said third region in the absence of substantial heat control.

5. The method of regenerating a particle form solid adsorbent material contaminated by a carbonaceous deposit which comprises continuously passing said material as a mass of particles downwardly through a regeneration zone, passing hot oxygen containing gases through said mass in an initial contacting region in the upper part of said zone while permitting the temperature thereof to rise, passing said mass at the temperature so achieved to a heat exchange region in said zone, passing a fluid heat exchange medium in indirect heat exchange relationship with said mass in said heat exchange region to adjust and maintain the temperature of said mass in said heat exchange region between a minimum temperature below which burning of said substance will not take place in the presence of oxygen containing gases and a maximum temperature above which said material is damaged by heat, thereafter passing said mass through a third region in the lower part of said zone and passing oxygen containing gases through said mass in said third region in the absence of substantial heat control.

6. The method of regenerating a particle form solid adsorbent material contaminated by a carbonaceous deposit which comprises continuously passing said material as a mass of particles downwardly through a regeneration zone, passing hot oxygen containing gases through said mass in an initial contacting region in the upper part of said zone while permitting the temperature thereof to rise, passing a fluid heat exchange medium in indirect heat exchange relationship with said mass in an intermediate region below said initial region to adjust and maintain the temperature of said mass in said heat exchange region between a minimum temperature below which burning of said substance will not take place in the presence of oxygen containing gases and a maximum temperature above which said material is damaged by heat, passing oxidizing gas in contact with said material in said intermediate region, thereafter passing said mass through a third region and passing oxygen containing gases through said mass in said third region in the absence of substantial heat control.

7. In the treatment of hydrocarbons by contact with a mass of adsorptive catalytic material in particle form wherein the said catalytic material is continuously passed through a reaction zone in contact with hydrocarbon fluid resulting in deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in said zone in the absence of temperature control, passing said mass at the temperature so achieved to an intermediate region, passing oxidizing gas in contact with said material in said intermediate zone, abstracting heat therefrom by passing a fluid heat exchange medium in indirect heat exchange relationship with at least a portion of said mass in said intermediate region to adjust and maintain the temperature of said mass in said intermediate region between a minimum temperature below which burning of said substance will not take place in the presence of oxygen containing gases and a maximum temperature above which said material is damaged by heat, thereafter passing said mass through a third region and passing oxygen containing gases through said mass in said third region in the absence of substantial heat control.

8. In the treatment of hydrocarbons by contact with a mass of adsorptive catalytic material in particle form wherein the said catalytic material is continuously passed through a reaction zone in contact with hydrocarbon fluid resulting in deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in the upper part of said zone while permitting the temperature thereof to rise, passing said mass at the temperature so achieved to a heat exchange region in said zone, passing a fluid heat exchange medium in indirect heat exchange relationship with said mass in said heat exchange region to adjust and maintain the temperature of said mass in said heat exchange region between a minimum temperature below which burning of said substance will not take place in the presence of oxygen containing gases and a maximum temperature above which said material is damaged by heat, thereafter passing said mass through a third region in the lower part of said zone and passing oxygen containing gases through said mass in said third region in the absence of substantial heat control.

9. In the treatment of hydrocarbons by contact with a mass of adsorptive catalytic material in particle form wherein the said catalytic material is continuously passed through a reaction zone in contact with hydrocarbon fluid resulting in deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in the upper part of said zone while permitting the temperature thereof to rise, passing a fluid heat exchange medium in indirect heat exchange relationship with said mass in an intermediate region below said initial region to adjust and maintain the temperature of said mass in said heat exchange region between a minimum temperature below which burning of said substance will not take place in the presence of oxygen containing gases and a maximum temperature above which said material is damaged by heat, passing oxidizing gas in contact with said material in said intermediate region, thereafter passing said mass through a third region and passing oxygen containing gases through said mass in said third region in the absence of substantial heat control.

10. In the catalytic conversion of hydrocarbons by contact with a mass of adsorptive catalytic material in particle form wherein the said catalytic material is continuously passed through a reaction zone in contact with hydrocarbon vapors resulting in conversion of the vapors and deposition of a contaminating carbonaceous substance on said material whereupon the contaminated material is withdrawn from the reaction zone and passed to and through a regeneration zone in which the said substance is burned from said material by contact with oxidizing gas; the method of conducting the regeneration operation which comprises continuously passing said material as a mass of particles downwardly through the regeneration zone, passing hot oxygen containing gases through said mass in an initial contacting region in said zone in the absence of substantial temperature control, passing said mass at the temperature so achieved to an intermediate region, passing oxidizing gas in contact with said material in said intermediate region, abstracting heat therefrom by passing a fluid heat exchange medium in indirect heat exchange relationship with at least a portion of said mass in said intermediate region to adjust and maintain the temperature of said mass in said intermediate region between a minimum temperature below which burning of said substance will not take place in the presence of oxygen containing gases and a maximum temperature above which said material is damaged by heat, thereafter passing said mass through a third region and passing oxygen containing gases through said mass in said third region in the absence of substantial heat control, the amount of combustion in said first and third regions being so limited as to avoid heating the mass to a damaging temperature while in said regions.

11. The method of regenerating a particle form solid adsorbent material contaminated by a carbonaceous deposit which comprises continuously passing said material as a mass of particles downwardly through a regeneration zone, passing hot oxygen containing gases through said mass in an initial contacting region in the upper part of said zone while permitting the temperature thereof to rise to a temperature below that at which the material will be damaged by heat, passing said mass at the temperature so achieved to a heat exchange region in said zone, passing a fluid heat exchange medium in indirect heat relationship with said mass in said heat exchange region to adjust and maintain the temperature of said mass in said heat exchange region between a minimum temperature below which burning of said substance will not take place in the presence of oxygen containing gases and a maximum temperature above which said material is damaged by heat, thereafter passing said mass through a third region in the lower part of said zone and passing oxygen containing gases through said mass in said third region, and again permitting temperature rise to a temperature below that at which the material will be damaged by heat.

12. The method of regenerating a particle form solid adsorbent material contaminated by a carbonaceous deposit which comprises continuously passing said material as a mass of particles downwardly through a regeneration zone, passing oxygen containing gases through said mass and accomplishing regenerative combustion in the absence of substantial temperature control in at least two separated regions within said mass while in said zone, the amount of combustion in each region being so limited that the exothermic heat thereof will not be sufficient to heat the material to a temperature damaging thereto, and between said separated combustion regions abstracting heat from said material by passing fluid heat exchange medium in indirect heat exchange relationship with said material to adjust and maintain the temperature of said material between a minimum temperature below which burning of the deposit will not take place in the presence of oxygen containing gases and a maximum temperature above which said material is damaged by heat.

13. The method of regenerating a particle form solid adsorbent material contaminated by a carbonaceous deposit which comprises continuously passing said material as a mass of particles downwardly through a regeneration zone, passing oxygen containing gases through said mass in an amount insufficient to interfere with the regular downward flow of said mass and accomplishing regenerative combustion in the absence of substantial temperature control in at least two separated regions within said mass while in said zone, the amount of combustion in each region being so limited that the exothermic heat thereof will not be sufficient to heat the material to a temperature damaging thereto, and between said separated combustion regions abstracting heat from said material by passing fluid heat exchange medium in indirect heat exchange relationship with said material to adjust and maintain the temperature of said material between a minimum temperature below which burning of the deposit will not take place in the presence of oxygen containing gases and a maximum temperature above which said material is damaged by heat.

14. In a catalytic conversion of hydrocarbons by contact with an adsorptive catalyst in particle form wherein the said catalyst is continuously passed through a reaction stage in contact with hydrocarbon vapors resulting in conversion of the vapors and deposition of a contaminating carbonaceous substance on said catalyst whereupon the contaminated catalyst is withdrawn from the reaction stage and passed to and through a regeneration stage in which the said substance is burned from said catalyst by contact with oxidizing gas; the method of conducting the regeneration stage which comprises continuously passing contaminated catalyst as a substantially compact mass of particles downwardly through said regeneration stage, contacting said catalyst in a first portion of said regeneration stage with an oxidizing gas in the absence of substantial abstraction of heat from the catalyst in said first portion to burn contaminating deposit from said catalyst and increase the temperature thereof, abstracting heat from catalyst which has been heated during contact with oxidizing gas as aforesaid, contacting catalyst from which heat has been abstracted as aforesaid with an oxidizing gas in the absence of substantial abstraction of heat from the system subsequent to said step of abstracting heat and prior to said withdrawal of regenerated catalyst.

15. The method of regenerating a particle form solid adsorbent material contaminated by a carbonaceous deposit which comprises continuously passing contaminated material as a mass of substantially compact particles downwardly through a regeneration stage, contacting said material in a first portion of said stage with an oxidizing gas in the absence of substantial abstraction of heat from the material in said first portion to oxidize contaminating deposit from said material, abstracting heat from catalyst which has been contacted with oxidizing gas as aforesaid, contacting catalyst from which heat has been abstracted as aforesaid with an oxidizing gas in the absence of substantial abstraction of heat from the system subsequent to said step of abstracting heat.

THOMAS P. SIMPSON.
JOHN W. PAYNE.
JOHN A. CROWLEY, Jr.